(12) United States Patent
Chen et al.

(10) Patent No.: US 8,456,829 B2
(45) Date of Patent: Jun. 4, 2013

(54) ALL-IN-ONE COMPUTER

(75) Inventors: Chen Chen, Shenzhen (CN); Hong-Zhi Sun, Shenzhen (CN); Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 319 days.

(21) Appl. No.: 12/945,675

(22) Filed: Nov. 12, 2010

(65) Prior Publication Data
US 2012/0002365 A1    Jan. 5, 2012

(30) Foreign Application Priority Data

Jul. 1, 2010   (CN) .......................... 2010 1 0212075

(51) Int. Cl.
*G06F 1/16* (2006.01)
(52) U.S. Cl.
USPC ................... 361/679.33; 312/332.1; 710/308; 455/575.4
(58) Field of Classification Search
USPC ................ 312/223.1, 223.2, 216, 208.4, 236, 312/237, 223.3, 327, 332.1; 710/303, 304, 710/305, 306, 308; 361/688, 724, 728, 801, 361/679.02, 679.04, 679.59, 679.6, 679.31, 361/679.32, 679.33, 679.34, 679.26, 679.03, 361/679.55, 679.27, 679.01, 679.11, 679.57, 361/679.08; 455/561.1, 561.2, 557, 575.1, 455/575.4, 550.1; 360/245.1, 97.16, 99.13, 360/69, 99.08, 99.16, 97.13, 234, 97.12, 360/110, 113, 245, 97.15; 165/104.26, 104.33, 165/104.21, 80.2, 84, 121, 185
See application file for complete search history.

(56) References Cited

U.S. PATENT DOCUMENTS

| | | | |
|---|---|---|---|
| 2001/0023141 A1* | 9/2001 | Chang | 439/76.1 |
| 2002/0097559 A1* | 7/2002 | Inoue | 361/688 |
| 2010/0271766 A1* | 10/2010 | Lin | 361/679.02 |

* cited by examiner

*Primary Examiner* — Hung Duong
(74) *Attorney, Agent, or Firm* — Altis Law Group, Inc.

(57) ABSTRACT

A computer includes an enclosure and a mainframe module enclosed in the enclosure. The mainframe module includes a base board, a motherboard, a partition panel perpendicularly attached on the base board, and a fan. The motherboard and the fan are attached on the base board at opposite sides of the partition panel. The fan is capable of blowing air to the motherboard to cool heat generating components of the motherboard.

19 Claims, 3 Drawing Sheets

ALL-IN-ONE COMPUTER

BACKGROUND

1. Technical Field

The present disclosure relates to all-in-one computers, and more particularly to an all-in-one computer with a cooling fan which blows air to a motherboard of the all-in-one computer.

2. Description of Related Art

All-in-One computers are desktop computers that combine the monitor into the same case as the CPU. A typical all-in-one computer includes a motherboard, a heat sink, a heat pipe, and a cooling fan. A plurality of heat generating components (e.g., CPU, north bridge chip, south bridge chip, etc.) is attached on the motherboard. The heat sink is attached to an outlet of the cooling fan. One end of the heat pipe is attached to the heat sink, and another end of the heat pipe is attached on the CPU. Thus, airflow output from the cooling fan flows through the heat sink and the heat pipe to dissipate heat generated by the CPU. However, the cooling fan in the computer can just dissipate heat generated by the CPU. The other heat generating components on the motherboard are still at risk of overheating.

DETAILED DESCRIPTION

Figure 1:
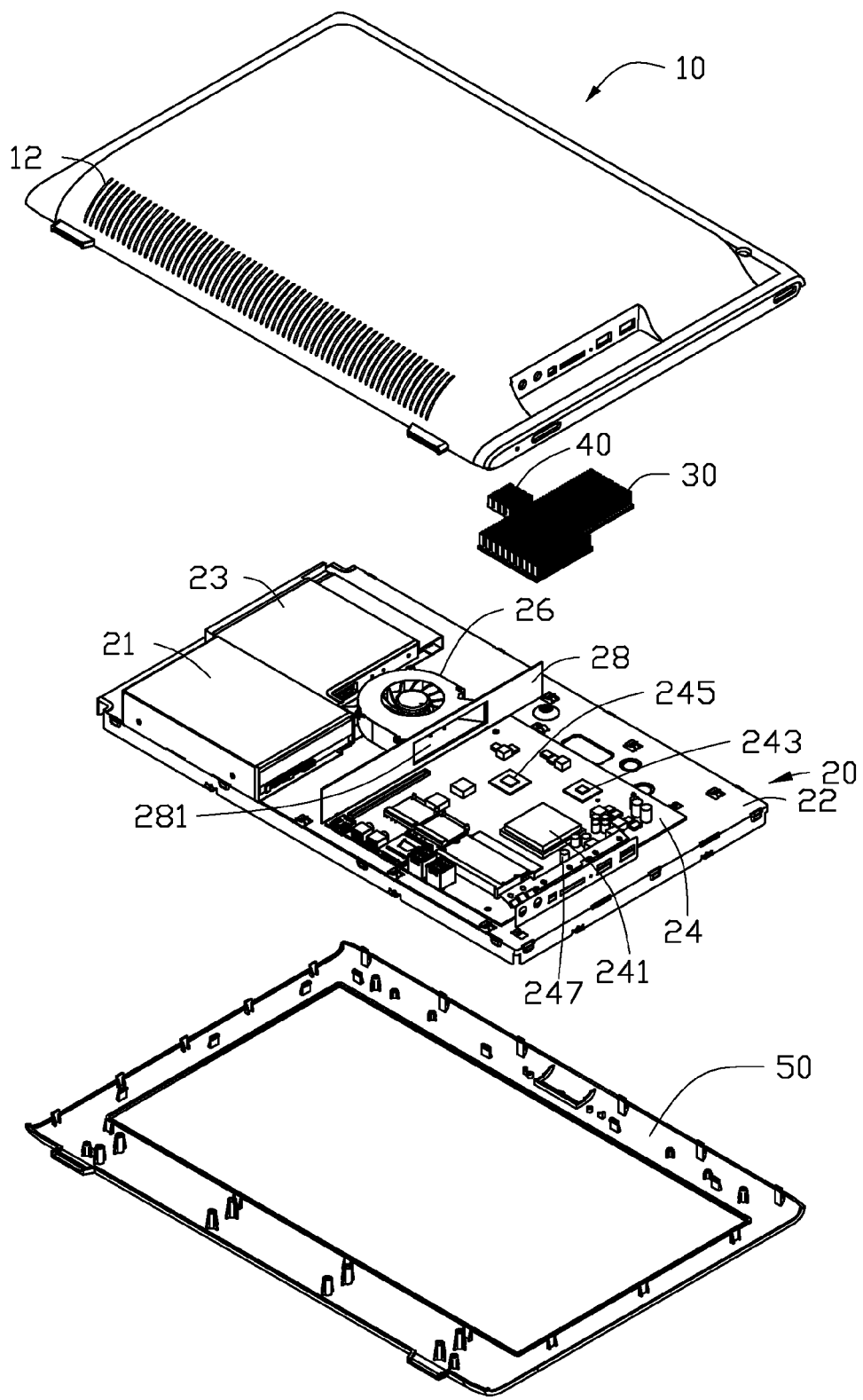
FIG. 1 an exploded view of an all-in-one computer according to an embodiment of the present disclosure.

Referring to FIG. 1, an embodiment of an all-in-one computer includes a rear panel 10, a mainframe module 20, a first heat sink 30, a second heat sink 40, and a enclosing frame 50. The rear panel 10 and the enclosing frame 50 form an enclosure that can enclose the mainframe module 20 therein. A plurality of heating dissipating holes 12 is defined in the rear panel 10.

The mainframe module 20 includes a base board 22, a motherboard 24 attached on the base board 22, a cooling fan 26 attached on the base board 22, and a partition panel 28 perpendicularly attached on the base board 22. The partition panel 28 is located between the cooling fan 26 and the motherboard 24. The motherboard 24 has heat generating components including a central processing unit (CPU) 241, a north bridge chip 243, a south bridge chip 245, and a plurality of capacitors 247 mounted thereon. A hard disk drive 21 and an optical disk drive 23 are mounted on the base board 22. The partition panel 28 divides the base board 22 into two; a first part and a second part. The motherboard 24 is located at the first part of the base board 22. The cooling fan 26, the hard disk drive 21, and the optical disk drive 23 are located at the second part of the base board 22. The cooling fan 26 can blow cooling air to the first part for cooling the motherboard 24. The partition panel 28 can prevent the cooling air from flowing back to the second part to enhance the heat dissipation effect for the motherboard 24.

Figure 2:
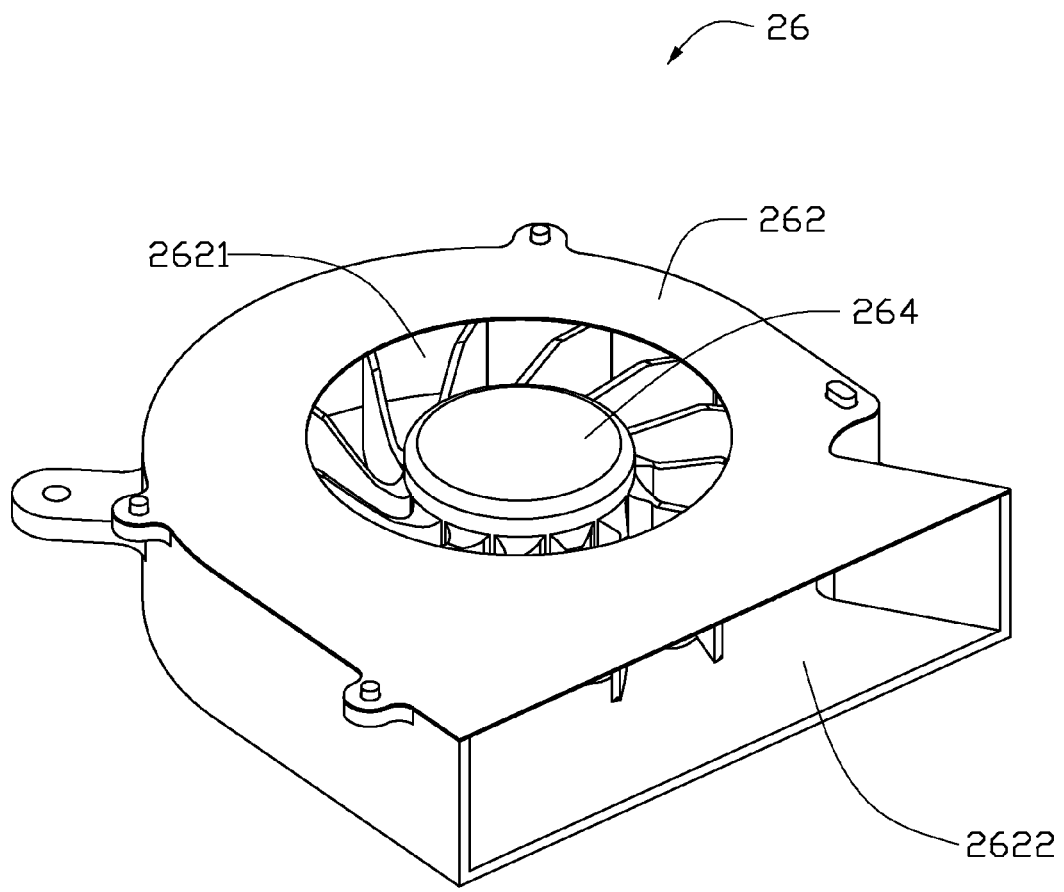
FIG. 2 is an enlarged view of a cooling fan in FIG. 1.

Referring to FIGS. 1 and 2, the cooling fan 26 includes a shell 262 and a rotatable fan blade module 264. A pair of air inlet openings 2621 is respectively defined in a top plate and a bottom plate of the shell 262. The shell 262 further has an air outlet 2622 defined at one side thereof. The air inlet opening 2621 allows air to flow into the cooling fan 26 along a vertical direction parallel to a rotating axis of the fan blade module 264. The air outlet 2622 allows air to flow out from the cooling fan 26 along a horizontal direction perpendicular to the vertical direction. An airflow opening 281 shaped the same as the air outlet 2622 of the cooling fan 26 is defined in the partition panel 28. The cooling fan 26 abuts against the partition panel 28, and the airflow opening 281 of the partition panel 28 is aligned with the air outlet 2622 of the cooling fan 26 (see FIG. 1).

Figure 3:
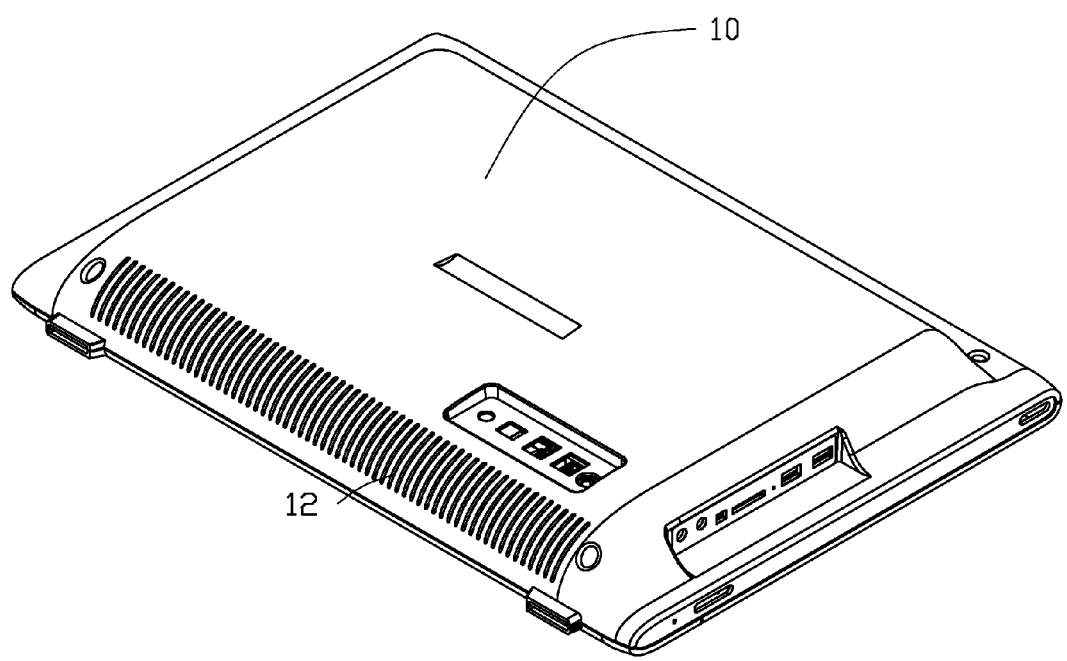
FIG. 3 is an assembled view of FIG. 1.

Referring to FIG. 3, in assembly, the first heat sink 30 is attached on and touches the CPU 241 and the north bridge chip 243. The second heat sink 40 is attached on the south bridge chip 245. The mainframe module 20 is mounted between rear panel 10 and the enclosing frame 50.

When the all-in-one computer is on, the heat generating components including the CPU 241, the north bridge chip 243, the south bridge chip 245, and the capacitors 247 generate heat. The first heat sink 30 dissipates heat generated by the CPU 241 and the north bridge chip 243. The second heat sink 40 dissipates heat generated by the south bridge chip 245. The fan blade module 264 of the cooling fan 26 rotates and generates airflow that flows from the air outlet 2622 to the motherboard 24. Air blown from the cooling fan 26 firstly flows to the second heat sink 40 on the south bridge chip 245. Then the air blown from the cooling fan 26 flows to first heat sink 30 via the interspaces between fins of the second heat sink 40. Afterwards, the air flows to the capacitors 247 via the interspaces between fins of the first heat sink 30. Thus, all of the heat generating components of the motherboard 24 can be cooled by the cooling fan 26.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A computer comprising:
an enclosure; and
a mainframe module enclosed in the enclosure, the mainframe module comprises a base board, a motherboard, a partition panel perpendicular attached on the base board, and a fan; the motherboard and the fan attached on the base board at opposite sides of the partition panel, the fan configured to blow air flowing from one side of the partition panel to the other side of the partition panel to cool heat generating components of the motherboard.

2. The computer of claim 1, wherein the partition panel divides the base board into a first part and a second part, the motherboard is located on the first part, and the fan is located on the second part.

3. The computer of claim 2, wherein the fan comprises a shell and a fan blade module enclosed in the shell, an air outlet is defined in the shell, and an airflow opening is defined in the partition panel and is aligned with the air outlet.

4. The computer of claim 3, wherein a pair of air inlet openings is defined in the shell that allows air flowing into the fan along a first direction, and the air outlet allows air flowing out from the fan along a second direction perpendicular to the first direction.

5. The computer of claim 4, wherein the heat generating components comprises a central processing unit, a north bridge chip, a south bridge chip.

6. The computer of claim 5, wherein a first heat sink is attached on the central processing unit and the north bridge chip, and a second heat sink is attached on the south bridge chip.

7. The computer of claim 6, wherein the heat generating components further comprises a plurality of capacitors, the fan is configured to blow air to the plurality of capacitors via interspaces in the first heat sink and the second heat sink.

8. The computer of claim 2, wherein at least one disk drive is attached on the base board and located at the second part.

9. The computer of claim 1, wherein a plurality of heat dissipating holes is defined in the enclosure.

10. A computer comprising:
- a motherboard with heat generating components attached thereon;
- a fan configured to force air along a first direction and a second direction that is perpendicular to the first direction; and
- a partition panel located between the fan and the motherboard, an airflow opening defined in the partition panel, the airflow opening, aligned along the second direction, allows air blown from the fan to flow to the heat generating components along the second direction.

11. The computer of claim 10, wherein the computer comprising a base board, the partition panel is perpendicularly attached to the base board and divides the base board into a first part and a second part, the motherboard is attached at the first part, and the fan is attached at the second part.

12. The computer of claim 11, wherein the fan comprises a shell and a fan blade module enclosed in the shell, an air outlet is defined in the shell, and the airflow opening has the same shape as the air outlet and is aligned with the air outlet.

13. The computer of claim 12, wherein a pair of air inlet openings is defined in the shell that allows air flowing into the fan along the first direction, and the air outlet allows air flowing out from the fan along the second direction.

14. The computer of claim 13, wherein the heat generating components comprises a central processing unit, a north bridge chip, a south bridge chip.

15. The computer of claim 14, wherein a first heat sink is attached on the central processing unit and the north bridge chip, and a second heat sink is attached on the south bridge chip.

16. The computer of claim 15, wherein the heat generating components further comprises a plurality of capacitors, the fan is configured to blow air to the plurality of capacitors via interspaces in the first heat sink and the second heat sink.

17. The computer of claim 11, wherein at least one disk drive is attached on the base board and located at the second part.

18. The computer of claim 10, wherein the computer comprises an enclosure with a plurality of heat dissipating holes defined therein.

19. A computer comprising:
- an enclosure;
- a mainframe module enclosed in the enclosure, the mainframe module comprises a base board, a motherboard, a partition panel perpendicular are attached on the base board, and a fan; the motherboard and the fan are attached on the base board at opposite sides of the partition panel, the fan is configured to blow air flowing from one side of the partition panel to the other side of the partition panel to cool heat generating components of the motherboard; and
- the heat generating components comprising a central processing unit, a north bridge chip and a south bridge chip, the south bridge chip is located near the fan, the central processing unit and the north bridge chip are located further away from the fan than the south bridge chip, a first heat sink is attached to the central processing unit and the north bridge chip, a second heat sink is attached to the south bridge chip, the first heat sink is larger than the second heat sink.

* * * * *